Dec. 18, 1928.

A. EIMER 1,695,803

ELECTRIC PRESSURE GENERATOR

Filed May 10, 1924      2 Sheets-Sheet 1

INVENTOR
August Eimer
BY
Frederick W. Barker
ATTORNEY

Dec. 18, 1928.
A. EIMER
1,695,803
ELECTRIC PRESSURE GENERATOR
Filed May 10, 1924     2 Sheets-Sheet 2
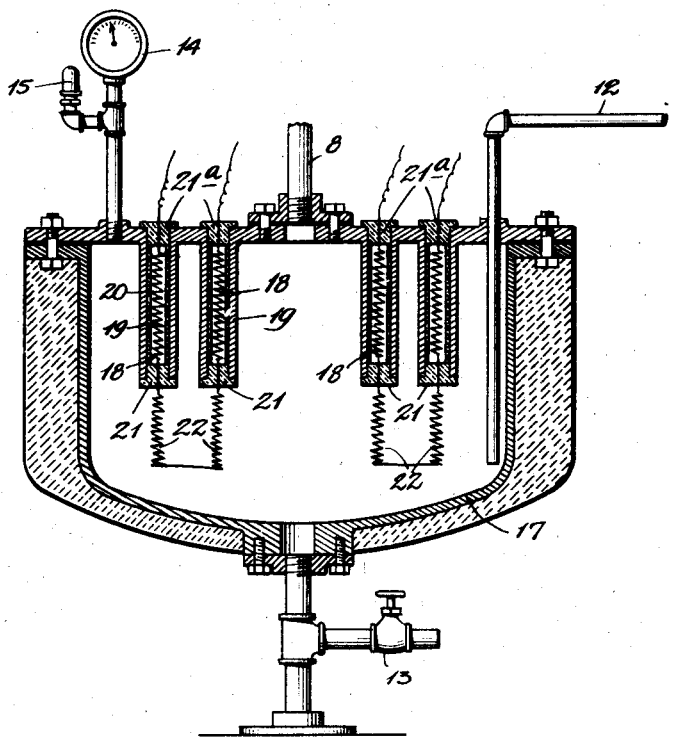
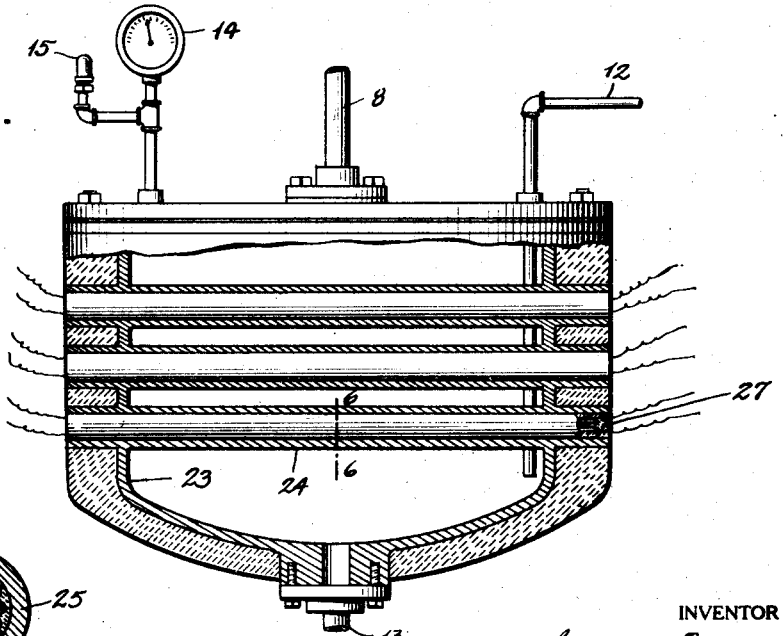
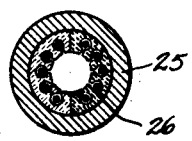
INVENTOR
August Eimer
BY
Frederick W. Barker
ATTORNEY Patented Dec. 18, 1928.

1,695,803

UNITED STATES PATENT OFFICE.

AUGUST EIMER, OF NEW YORK, N. Y.

ELECTRIC PRESSURE GENERATOR.

Application filed May 10, 1924. Serial No. 712,239.

This invention relates to a novel power generating system employing certain kinds of fluid media, other than water, which are possesed of characteristics that render them particularly serviceable for employment in a closed power circuit, together with the use of electrical resistance heating means under such regulated control that the temperature of the fluid medium may be raised to and maintained at the point or degree suitable for desirably expanding the fluid medium.

Essentially my invention, in one form thereof, comprehends the employment of a fluid medium which is relatively a non-conductor of electricity, for the reason that the resistance conductors are preferably exposed or partially exposed to direct contact with the fluid medium as the means of attaining the greatest heating efficiency for the amount of current consumed.

Furthermore, my invention includes the provision of a large number of resistance conductors within the generator, so arranged that they cannot enter into short circuiting relation, but serving to supply heat at numerous points throughout the body of the fluid medium. By equi-spacing of the resistance conductors in the body of fluid medium the temperature thereof is raised evenly throughout, resulting in the production of a uniform cycle, as the expanded medium passes off to perform work, is condensed and returned to the generator.

In another form of my invention, where it may be desirable to have the electrical heating units removable from the generator while in service, for repair and replacement purposes, I provide a pressure containing casing, in the form of a boiler and fit therein one or a number of tubes, whose open ends are exposed outside the casing, so that a resistance conductor, suitably insulated, may be removably inserted within the tubes to supply the heat necessary in creating pressure.

Other features and advantages of my invention will hereinafter appear.

In the drawing:

Fig. 4 is a side sectional elevation of a generator provided with resistor heating elements which are partly exposed to the fluid medium therein.

Fig. 5 is a similar view of a modified form of generator which is provided with a number of open ended tubes that extend through its walls and are adapted to removably contain insulated resistor heating elements, and Fig. 6 is a section of one of said tubes taken on the line 6—6 of Fig. 5.

Figure 1:
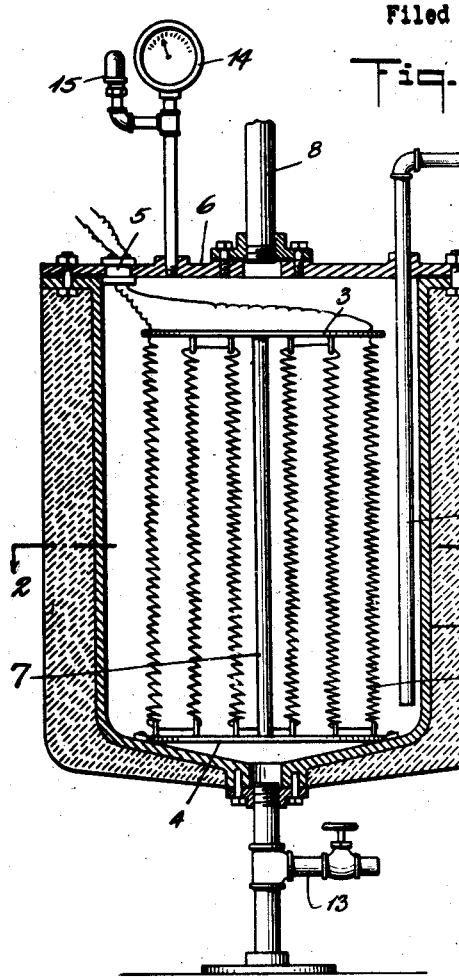
Figure 1 is a vertical, sectional view of a generator embodying my improvements.

In the example of my invention illustrated in the accompanying drawing, let 1 indicate a boiler which contains as a pressure medium a liquid that is relatively a non-conductor of electricity, such for instance as carbon tetrachloride, acetylene bichloride or other of the acetylene compounds, carbon perchloride, or equivalent liquids.

Liquid pressure media such as the foregoing are employed by me for generating power mainly because they are expansible at relatively low temperatures, are non-inflammable, and are relatively non-conductors of electricity, so that electrical resistance conductors, without insulation, can be placed within the boiler in direct contact with the liquid therein, without the occurrence of short circuiting through the liquid medium.

I am aware that other liquids, expansible at higher temperatures, also relatively non-conductors of electricity, are available for use as pressure media in my improved generator.

In heating with electrical resistors efficiency is achieved by exposing a bare resistor directly to the substance to be heated, since the intensity of the heat delivered by the resistance conductor is diminished when delivered through insulation of any character, and therefore the essence of my invention, in this form thereof, consists in the employment of a relatively non-conductive liquid expansion medium, and in applying direct to such medium the bare surface of the resistor.

Another characteristic feature of the liquid pressure media referred to as employed by me is that no chemical reaction occurs between them and metallic or other resistors, whose service life is thereby not diminished by corrosion or deterioration of any kind, nor are the resultant vapors poisonous or otherwise harmful.

Efficiency in vapor generation is further served by placing a plurality of resistors in close, spaced relation, to provide a maximum of heating surface, and if the resistors be equi-spaced throughout the boiler, it is obvious that the uniformity of heat dispersion will prove most advantageous in promoting rapid and efficient power generation.

The boiler shell 1 is shown as containing a plurality of resistors 2, which may be of any known and suitable character, though here represented in the form of coils, extended between insulation supports 3, 4 and in series connection, their terminals being carried outwardly as through an insulation plug 5 located in the boiler head 6.

Merely as convenient structure the supports 3, 4 are connected in frame-like form by a central post 7.

Figure 2:
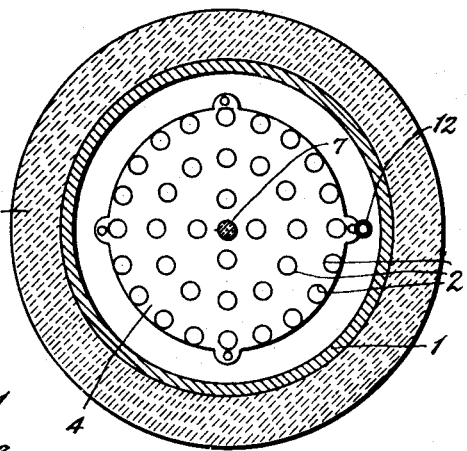
Fig. 2 is a section on the line 2—2 of Fig. 1.
Figure 3:
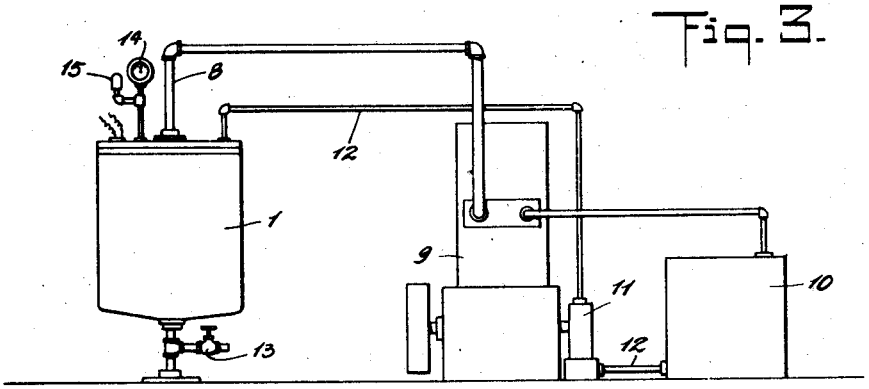
Fig. 3 is a diagrammatic elevation of a power plant including my improved generating means.

The boiler is to be charged with a liquid characterized as being a non-conductor of electricity. This permits the placing of the resistors in near, spaced proximity, as exemplified in Figs. 1 and 2, so that the liquid mass in the boiler is penetrated by numerous heating elements, and zones of maximum heat are created between adjacent resistors. It follows that by equi-spacing the resistors apart the temperature of the entire liquid mass is raised uniformly.

The vapors generated in the boiler are carried off as by a pipe 8 to perform work, an engine 9 typifying the load; the exhaust passes to a condenser 10, and the condensed liquid may be returned to the boiler as by a pump 11 and piping 12.

The boiler is shown as provided with a valved drain outlet 13, a pressure gauge 14, and safety valve 15.

Also the boiler may have a covering 16 of material which is a non-conductor of heat.

In the example of my invention illustrated in Fig. 4 I have shown a generator 17 adapted for service with the relatively non-conductive liquids before referred to, and employing as heating elements electrical resistors which extend into the generator but are only partly exposed to direct contact with the pressure medium. Given a condition where certain higher pressures are generated with the liquid media herein referred to, a degree of conductivity may be developed which would permit a current to flow through the liquid medium if the full terminal potential of the resistors were placed across the liquid medium. Due to a partial covering of the resistors there will be in the liquid medium only the difference of potential between the end points of the exposed portion of the resistor, and this potential will be insufficient to set up any appreciable current through the liquid medium.

As shown, the resistors are enclosed within tubes 19 that extend inwardly from the generator surface, suitable insulation material 20 intervening between said resistors and tubes, and the tube ends having insulation plugs 21, 21ª with orifices through which the resistors are passed. The orifices are of course to be sealed. This arrangement leaves the portion 22 of the resistors having relatively low difference of potential between its end points exposed to contact with the pressure medium, and minimizes the liability of current flowing through the medium even when relatively high pressures are developed in the generator which cause the conductivity of the liquid medium to rise.

In still another form of my invention, using the same relatively non-conductive pressure media, where it is desirable that the resistor heating elements may be removable from the generator, and renewed, while it is under operation, the generator 23 (see Figs. 5 and 6) is provided with a number of tubes 24, disposed interiorly thereof, to be fully immersed within the fluid contents thereof, said tubes having open ends which extend out beyond opposite walls of the generator.

These tubes are adapted to removably contain heating units composed of refractories 25 having grooves to contain the resistors 26 which are thereby held in insulated relation with respect to their own bends and the tubes. The heating units, thus constituted, may be freely inserted within the tubes 24, and removed therefrom, without interfering with the operation of the generator. The ends of tubes 24 are to be closed with suitable stoppers 27 to prevent the loss of heat that would otherwise ensue.

Variations within the spirit and scope of my said invention are equally comprehended by the foregoing disclosure.

I claim:

A generator comprising a boiler adapted to contain a liquid of low conductive capacity, a closure for said boiler, tubes depending from said closure and extending into the liquid and electrical heating elements mounted within said tubes, insulated and sealed therein, a portion of said elements extending below said tubes and being exposed to contact with the liquid.

Executed this 24th day of March, 1924.

AUGUST EIMER.